United States Patent
Jiang et al.

(10) Patent No.: US 10,432,417 B2
(45) Date of Patent: Oct. 1, 2019

(54) SYSTEMS AND METHODS FOR TRANSMITTING AN UPDATED PARTITION STATE TO SENSORS OR DEVICES

(71) Applicant: Honeywell International Inc., Morristown, NJ (US)

(72) Inventors: Hongye Jiang, Shanghai (CN); Yi Wang, Shanghai (CN); Bin Yang, Shanghai (CN)

(73) Assignee: ADEMCO INC., Golden Valley, MN (US)

( * ) Notice: Subject to any disclaimer, the term of this patent is extended or adjusted under 35 U.S.C. 154(b) by 120 days.

(21) Appl. No.: 15/842,064

(22) Filed: Dec. 14, 2017

(65) Prior Publication Data

US 2019/0190738 A1    Jun. 20, 2019

(51) Int. Cl.
*H04L 12/28* (2006.01)
*H04W 52/02* (2009.01)
*H04L 5/00* (2006.01)
(Continued)

(52) U.S. Cl.
CPC ...... *H04L 12/2803* (2013.01); *G07C 9/00166* (2013.01); *H04L 5/0048* (2013.01);
(Continued)

(58) Field of Classification Search
CPC . H04L 5/0048; H04L 12/2803; H04L 12/403; H04L 63/0281; H04W 28/06; H04W 52/0229; H04W 4/043; H04W 52/0206; H04W 52/0209; H04W 56/0015; H04W 76/27; G07C 9/00166
See application file for complete search history.

(56) References Cited

U.S. PATENT DOCUMENTS 9,049,644 B2    6/2015   Bahr et al.
2007/0004436 A1*  1/2007   Stirbu .............. H04L 63/0281
                                                    455/503
(Continued)

FOREIGN PATENT DOCUMENTS

WO         0035209 A1     6/2000
WO      2009024925 A2     2/2009
WO   WO 2009/116682 A1    9/2009

OTHER PUBLICATIONS

Teng et al., A Survey on Real-Time MAC Protocols in Wireless Sensor Networks, Communications and Network, 2010, 2, 104-112, doi:10.4236/cn.2010.22017 Published Online May 2010 (http://www.SciRP.org/journal/cn); Copyright © 2010 SciRes.
(Continued)

*Primary Examiner* — Le H Luu
(74) *Attorney, Agent, or Firm* — Husch Blackwell LLP

(57) ABSTRACT

Systems and methods for updating a partition state of individual sensors or devices in a system are provided. Such systems and methods may include an access point broadcasting a beacon signal including a partition state change indicator portion and a partition state update portion, the sensors or devices periodically waking up to receive the partition state change indicator portion, and responsive to predetermined content of the partition state change indicator portion, one or more of the sensors or devices remaining awake to receive an updated partition state identified in the partition state update portion.

20 Claims, 3 Drawing Sheets

(51) Int. Cl.
  *H04L 12/403* (2006.01)
  *G07C 9/00* (2006.01)
  *H04W 28/06* (2009.01)

(52) U.S. Cl.
  CPC ....... *H04L 12/403* (2013.01); *H04W 52/0229* (2013.01); *H04W 28/06* (2013.01)

(56) References Cited

U.S. PATENT DOCUMENTS

| | | | |
|---|---|---|---|
| 2009/0141661 A1* | 6/2009 | Li | H04W 76/27 370/311 |
| 2014/0086124 A1* | 3/2014 | Knowles | H04W 52/0277 370/311 |
| 2015/0223085 A1* | 8/2015 | Siomina | H04W 52/0206 370/252 |
| 2015/0223169 A1 | 8/2015 | Ghosh | |
| 2016/0037449 A1 | 2/2016 | Kandhalu Raghu et al. | |
| 2016/0127995 A1* | 5/2016 | Merlin | H04W 52/0209 370/311 |
| 2017/0026907 A1* | 1/2017 | Min | H04W 52/0229 |
| 2018/0020407 A1* | 1/2018 | Emmanuel | H04W 52/0229 |
| 2018/0027386 A1* | 1/2018 | Zampini, II | H04W 4/043 370/311 |
| 2018/0027495 A1* | 1/2018 | Song | H04W 52/0209 455/343.2 |
| 2019/0007902 A1* | 1/2019 | Khaled | H04W 56/0015 |

OTHER PUBLICATIONS

Extended European search report from corresponding EP patent application 18191420.1 dated Apr. 18, 2019.

* cited by examiner

SYSTEMS AND METHODS FOR TRANSMITTING AN UPDATED PARTITION STATE TO SENSORS OR DEVICES

FIELD

The present invention relates generally to communication for security systems or home automation systems. More particularly, the present invention relates to systems and methods for updating a partition state of individual sensors or devices.

BACKGROUND

Known systems and methods for updating partition states for sensors or devices of a security system or a home automation system broadcast updated partition states either individually to each of the sensors or devices or periodically in a payload portion of a recurring beacon signal. However, such systems and methods suffer from latency problems or are limited in a number of connectable sensors or devices due to network size limitations of a standard payload portion of the recurring beacon signal.

In view of the above, there is a continuing, ongoing need for improved systems and methods.

DETAILED DESCRIPTION

Figure 1:
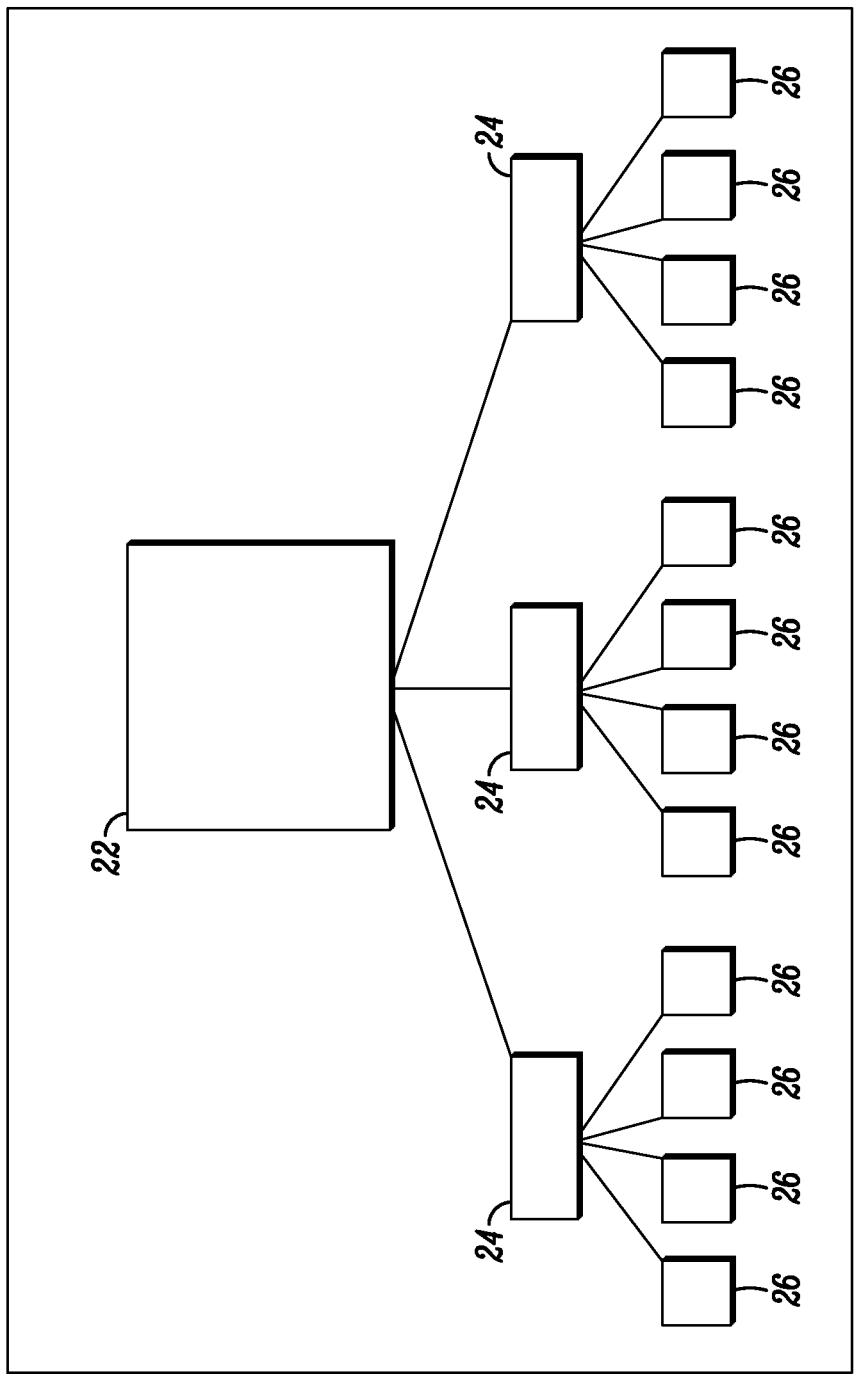
FIG. 1 is a block diagram of a security system or a home automation system in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein may include systems and methods for updating and displaying a partition state of sensors or devices in a security system or a home automation system. For example, systems and methods disclosed herein may broadcast a recurring beacon signal that includes a partition state change indicator portion and a partition state update portion, and the sensors or devices may periodically wakeup to receive the partition state change indicator portion and, responsive to predetermined content of the partition state change indicator portion, remain awake to receive an updated partition state identified in the partition state update portion.

Systems and methods as disclosed herein are described in connection with home automation systems and security systems. It is to be understood that such systems may include, but are not limited to systems that include a control panel in communication with a plurality of access points or gateway devices and a plurality of sensors or devices coupled to the control panel through the plurality of access points.

In accordance with disclosed embodiments, the control panel may maintain a record associating each of the plurality of sensors or devices with a respective one of a plurality of partitions. In some embodiments, the plurality of sensors or devices may include at least one of output sirens, fire alarms, motion sensors, smoke alarms, and proximity sensors. Furthermore, in some embodiments, the plurality of partitions may group and facilitate controlling the plurality of sensors or devices irrespective of established zones of the security system or the home automation system and irrespective of which of the plurality of access points each of the plurality of sensors or devices uses to communicate with the control panel. For example, each of the plurality of partitions may include a respective partition state that controls operation of each of the plurality of sensors or devices assigned to the respective one of the plurality of partitions irrespective of an operational state of each of the plurality of sensors or devices assigned to the respective one of the plurality of partitions. In some embodiments, the partition state may include one of armed or disarmed. For example, each of the plurality of sensors or devices that is assigned the partition state of armed can operate in a manner similar to how each of the plurality of sensors or devices would operate in an armed operational state if coupled directly to the control panel in a non-partitioned system. Similarly, each of the plurality of sensors or devices that is assigned the partition state of disarmed can operate in a manner similar to how each of the plurality of sensors or devices would operate in a disarmed operational state if coupled directly to the control panel in the non-partitioned system.

In accordance with disclosed embodiments, each of the plurality of access points may periodically broadcast a respective beacon signal to respective ones of the plurality of sensors or devices assigned to a respective one of the plurality of access points. For example, the respective beacon signal may include the partition state change indicator portion and the partition state update portion. In some embodiments, the partition state change indicator portion may include respective indicators for the respective ones of the plurality of sensors or devices assigned to the respective one of the plurality of access points broadcasting the respective beacon signal, and the partition state update portion may include a respective update values for the respective ones of the plurality of sensors or devices assigned to the respective one of the plurality of access points broadcasting the respective beacon signal. In this regard, each of the respective indicators included in the partition state change indicator portion may correspond to a respective one of the plurality of sensors or devices that that is assigned to the respective one of the plurality of access points broadcasting the respective beacon signal. Furthermore, each of the respective indicators included in the partition state change indicator portion may signal whether the partition state update portion forthcoming includes an update to the partition state of the respective one of the plurality of sensors or devices that corresponds with a respective one of the respective indicators and, therefore, that the respective one of the plurality of sensors or devices that corresponds with the respective one of the respective indicators should stay awake for receipt of the same. In some embodiments, each of the respective indicators may include a single binary bit. For example, each of the respective indicators may have a value of 1 to indicate a change in the partition state and a value of 0 to indicate no change in the partition state or vice versa. In some embodiments, the partition state change indicator portion may be contained within a payload portion of the respective beacon signal as designated by the Institute of Electrical and Electronics Engineers 802.15.4 specification.

In accordance with disclosed embodiments, each of the plurality of sensors or devices may periodically wake up to receive the partition state change indicator portion of the respective beacon signal from each of the plurality of access points and may remain awake to receive the partition state update portion when the respective one of the respective indicators corresponding with the respective one of the plurality of sensors or devices signals that the partition state update portion forthcoming includes the update to the partition state of the respective one of the plurality of sensors or devices and, therefore, that the respective one of the plurality of sensors or devices should stay awake for receipt of the same. For example, a first one of the plurality of sensors or devices may wake up at a preprogrammed time in a respective wakeup cycle to receive the respective beacon signal, determine whether a first one of the respective indicators in the partition state change indicator portion in the respective beacon signal corresponding to the first one of the plurality of sensors or devices indicates the update to the partition state of the first one of the plurality of sensors or devices, and return to a low sleep state until a next wakeup cycle when the first one of the respective indicators fails to indicate the update or remain awake to receive the partition state update portion when the first one of the respective indicators indicates the update forthcoming.

In some embodiments, each of the plurality of access points may broadcast the respective beacon signal in a designated time slot to avoid interference therewith and overlap therebetween. In these embodiments, each the plurality of sensors or devices assigned to the respective one of the plurality of access points may periodically wake up at a beginning of the designated time slot for the respective one of the plurality of access points. For example, the respective wakeup cycle for each of the plurality of sensors or devices may be preprogrammed to align with the designated time slot of the respective one of the plurality of access points assigned to the respective one of the plurality of sensors or devices.

In some embodiments, the control panel may program the respective wakeup cycle for each of the plurality of sensors or devices, and in some embodiments, each of the plurality of sensors or devices may receive a respective wakeup trigger. For example, when the respective one of the plurality of sensors or devices receives the respective wakeup trigger, the respective one of the plurality of sensors or devices may wake up to receive the partition state change indicator portion in a next respective beacon signal from each the plurality of access points assigned to the respective one of the plurality of sensors or devices. After receiving the next available respective beacon signal, in some embodiments, the respective one of the plurality of sensors or devices may resume the respective wakeup cycle previously interrupted by the respective wakeup trigger, and in some embodiments, the respective one of the plurality of sensors or devices may restart the respective wakeup cycle.

In some embodiments, a default value of each of the respective indicators may indicate no change in the partition state. Additionally or alternatively, in some embodiments, each of the respective indicators may be reset to indicate no change in the partition state following completion of the respective wakeup cycle for the respective one of the plurality of sensors or devices.

In some embodiments, the control panel may receive a partition state update signal indicating the update to the partition state for the first one of the plurality of partitions. The control panel may then identify, from the record, a first set of the plurality of sensors or devices assigned to the first one of the plurality of partitions and, responsive thereto, may direct each of the plurality of access points assigned to each one of the first set of the respective plurality of sensors or devices to toggle respective ones of the respective indicators corresponding to each one of the first set of the respective plurality of sensors or drives in a next broadcast of the respective beacon signal therefrom to indicate the update to the partition state.

FIG. 1 is a block diagram of a security system or a home automation system 20 in accordance with disclosed embodiments. As shown in FIG. 1, the system 20 may include a control panel 22, a plurality of access points or gateways 24 coupled to the control panel 22, and a plurality of sensors or devices 26 coupled to the plurality of access points 24.

Figure 2:
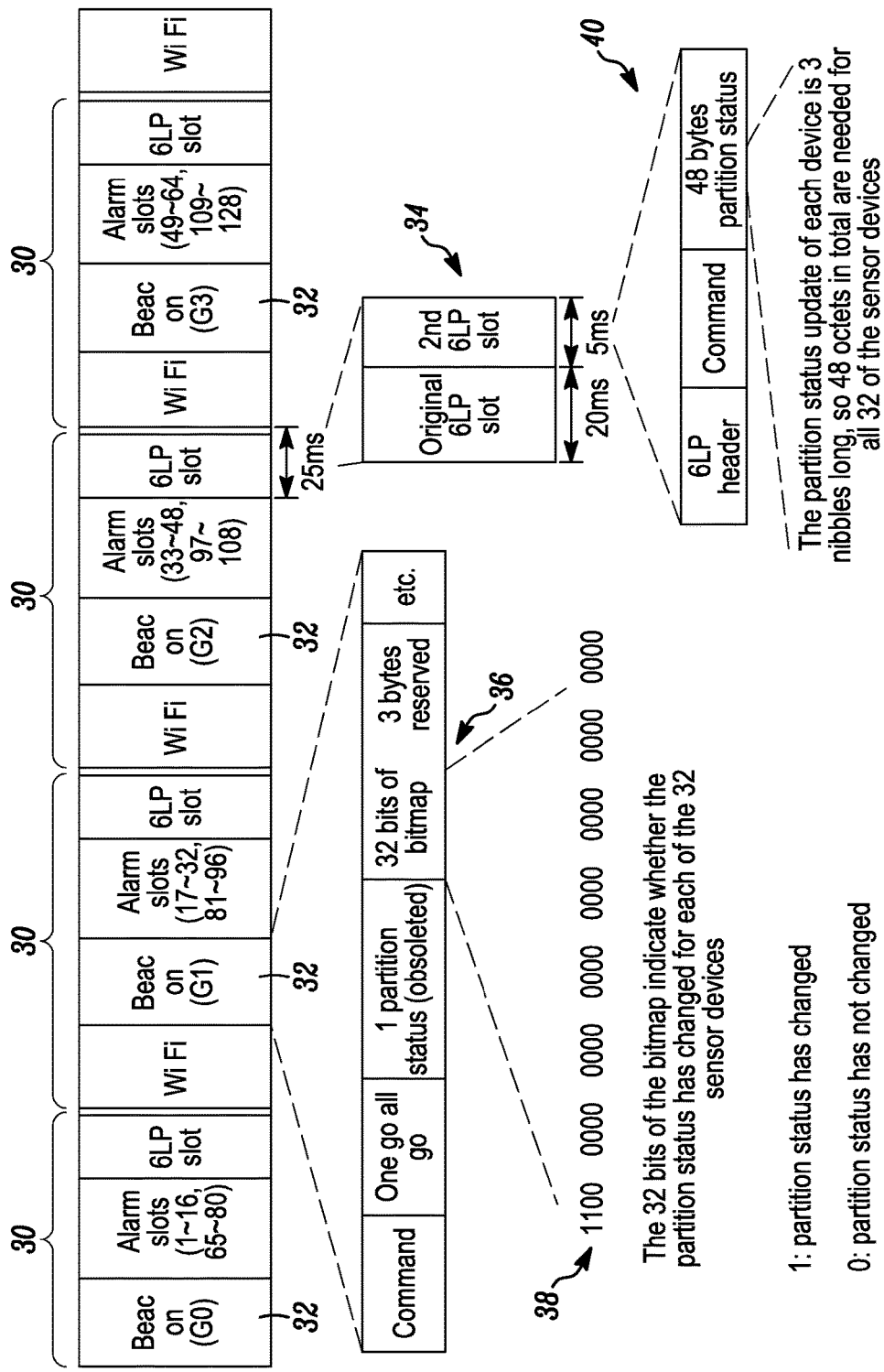
FIG. 2 is a block diagram of beacon signals in accordance with disclosed embodiments.

FIG. 2 is a block diagram of beacon signals 30 broadcast by the plurality of access points 24 in accordance with disclosed embodiments. Each of the beacon signals 30 may include a partition state change indicator portion 32 and a partition state update portion 34. For example, the partition state indicator portion 32 may include a bit map portion 36 with a length of thirty-two bits, each of which can be used to indicate a change in a partition state of a respective partition assigned to a respective one of the plurality of sensors or devices 26. Each bit 38 of the bit map portion 36 may be toggled between 1 and 0 to indicate a change in the partition state of the respective partition. In some embodiments, the bit 38 may indicate no change in the partition state when the partition state has failed to change within a predetermined time period that is dependent on a type of the respective one of the plurality of sensors or devices 26. For example, in some embodiments, where the type of the respective one of the plurality of sensors or devices is a siren or a smoke detector, the bit 38 may indicate no change in the partition state when the partition state has failed to change within 5 seconds. In some embodiments, the partition state update portion 34 may be at an end of a respective one of the beacon signals 30 and may be 5 milliseconds in length. For example, the partition state update portion 34 may include a partition state bitmap portion 40 that can be divided into sections corresponding to respective ones of plurality of sensors and devices 26 that are assigned to one of the plurality of access points 24 broadcasting the respective one of the beacon signals 30. In some embodiments, the partition state bitmap portion 40 may have a length of forty-eight bytes to accommodate a 3 nibble length partition status for thirty-two sensors or devices, each of which can correspond to one of the thirty-two bits of the bit map portion 36.

Figure 3:
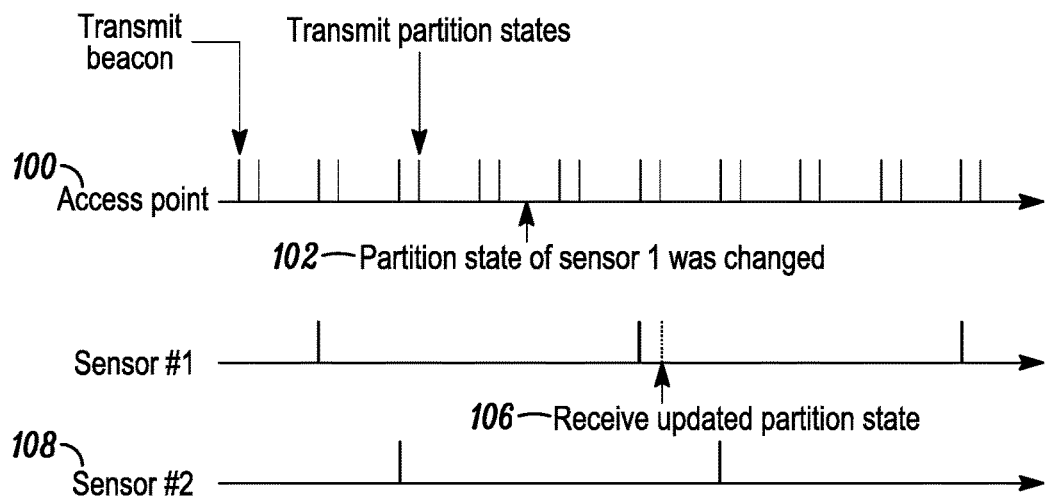
FIG. 3 is a flow diagram of a method in accordance with disclosed embodiments.

FIG. 3 is a flow diagram of a method in accordance with disclosed embodiments. A first of the plurality of access points 24 may periodically broadcast a first beacon signal 30 including the partition state change indicator portion 32 and the partition state update portion 34, as in 100. Absent the change in the partition state of a first one of the plurality of sensors or devices 26, a bit corresponding to the first one of the plurality of sensors or devices 26 in the partition state change indicator portion 32 of the first beacon signal 30 can refrain from indicating an update to the partition state of the first one of the plurality of sensors or devices 26 in the partition state update portion 34 forthcoming, and both the first one of the plurality of sensors or devices 26 and a second one of the plurality of sensors or devices 26 can wake to receive the partition state change indicator portion 32 and return to a low power sleep state immediately thereafter. However, the partition state of the first one of the plurality of sensors or devices may change, as in 102, and responsive thereto, the first beacon signal 30 that the first one of the plurality of access points 24 transmits thereafter can change the bit corresponding to the first one of the plurality of sensors or devices 26 in the partition state change indicator portion 32 to indicate the update to the partition state of the first one of the plurality of sensors or devices 26 in the partition state update portion 34 forthcoming. As shown in FIG. 3, upon receipt thereof, the first one of the plurality of sensors or devices 26 may stay awake to subsequently receive the partition state update portion 34 of the respective beacon signal 30, as in 106. However, the second one of the plurality of sensors or devices 26 may still return to the low power sleep state immediately after receiving the partition state change indicator portion 32, as in 108, because the bit corresponding to the second one of the plurality of sensors or devices 26 in the partition state change indicator portion 32 did not indicate the update to the partition state of the second one of the plurality of sensors or devices 26 in the partition state update portion 34 forthcoming, as in 108.

Figure 4:
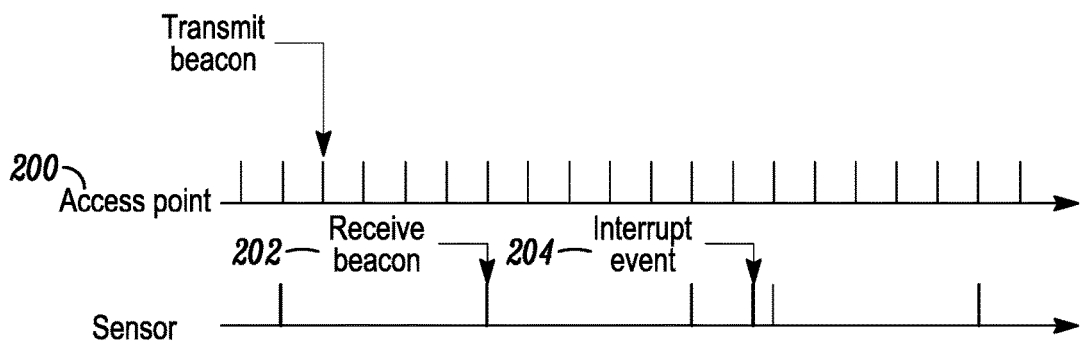
FIG. 4 is a flow diagram of a method in accordance with disclosed embodiments.

FIG. 4 is a flow diagram of a method in accordance with disclosed embodiments. The first of the plurality of access points 24 may periodically broadcast a first beacon signal 30 including the partition state change indicator portion 32 and the partition state update portion 34, as in 200, and the first one of the plurality of sensors or devices 26 can periodically wake up, according to a first wakeup cycle, to receive the first beacon signal 30 and return to a low power sleep state immediately thereafter, as in 202. However, when the first one of the plurality of sensors or devices 26 receives a first wakeup trigger, as in 204, the first one of the plurality of sensors or devices 26 may wake up to receive the first beacon signal 30 that the first of the plurality of access points 24 transmits thereafter, regardless of the first wakeup cycle.

Although a few embodiments have been described in detail above, other modifications are possible. For example, the steps described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A system comprising:
 a control panel;
 a first access point coupled to the control panel; and
 a first plurality of sensors or devices assigned to the first access point,
 wherein the control panel maintains a record associating each of the first plurality of sensors or devices with a respective one of a plurality of partitions,
 wherein the first access point periodically broadcasts a first beacon signal to the first plurality of sensors or devices,
 wherein the first beacon signal includes a first partition state change indicator portion and a first partition state update portion,
 wherein the first partition state change indicator portion includes first respective indicators, each of which corresponds to a respective one of the first plurality of sensors or devices,
 wherein the first partition state update portion includes first respective update values, each of which corresponds to the respective one of the first plurality of sensors or devices, and
 wherein each of the first plurality of sensors or devices periodically wakes up to receive the first partition state change indicator portion of the first beacon signal from the first access point and remains awake to receive the first partition state update portion when one of the first respective indicators corresponding to the respective one of the first plurality of sensors or devices indicates a change in a state of the respective one of the plurality of partitions associated with the respective one of the first plurality of sensors or devices.

2. The system of claim 1 wherein each of the first respective indicators includes a single binary bit value.

3. The system of claim 1 wherein each of the first plurality of sensors or devices wakes up to receive the first partition state change indicator portion of the beacon signal from the first access point and returns to a low power sleep state when the one of the first respective indicators corresponding to the respective one of the first plurality of sensors or devices indicates no change in the state of the respective one of the plurality of partitions associated with the respective one of the first plurality of sensors or devices.

4. The system of claim 1 wherein each of the first plurality of sensors or devices periodically wakes up based on a respective wakeup cycle, and wherein each of the first plurality of sensors or devices wakes up, responsive to receiving a respective wakeup trigger, to receive a next broadcast of the first beacon signal that the first access point transmits thereafter, regardless of the respective wakeup cycle.

5. The system of claim 1 wherein the control panel receives a partition state update signal indicating a change in the state for a first of the plurality of partitions, identifies, from the record, a first set of the first plurality of sensors or devices assigned to the first of the plurality of partitions, and directs the access point to toggle respective ones of the first respective indicators corresponding to each of the first set of the first plurality of sensors or devices in a next broadcast of the first beacon signal.

6. The system of claim 1 wherein a default value of each of the first respective indicators indicates no change in the state of the respective one of the plurality of partitions.

7. The system of claim 1 wherein the access point broadcasts the beacon signal in a designated time slot and each of the plurality of sensors or devices periodically wakes up at a beginning of the designated time slot.

8. The system of claim 1 further comprising:
 a second access point coupled to the control panel; and
 a second plurality of sensors or devices assigned to the second access point,
 wherein the record includes data associating each of the second plurality of sensors or devices with the respective one of the plurality of partitions,
 wherein the second access point periodically broadcasts a second beacon signal to the second plurality of sensors or devices,
 wherein the second beacon signal includes a second partition state change indicator portion and a second partition state update portion,
 wherein the second partition state change indicator portion includes second respective indicators, each of which corresponds to a respective one of the second plurality of sensors or devices, wherein the second partition state update portion includes second respective update values, each of which corresponds to the respective one of the second plurality of sensors or devices, wherein each of the second plurality of sensors or devices periodically wakes up to receive the second partition state change indicator portion of the second beacon signal from the second access point and remains awake to receive the second partition state update portion when one of the second respective indicators corresponding to the respective one of the second plurality of sensors or devices indicates a change in the state of the respective one of the plurality of partitions associated with the respective one of the second plurality of sensors or devices, and wherein the control panel receives a partition state update signal indicating a change in the state for a first of the plurality of partitions, identifies, from the record, a first set of the first plurality of sensors or devices and the second plurality of sensors or devices assigned to the first of the plurality of partitions, directs the first access point to toggle respective ones of the first respective indicators corresponding to each of the first plurality of sensors or devices included in the first set of the first plurality of sensors or devices and the second plurality of sensors or devices in a next broadcast of the first beacon signal, and directs the second access point to toggle respective ones of the second respective indicators corresponding to each of the second plurality of sensors or devices included in the first set of the first plurality of sensors or devices and the second plurality of sensors or devices in a next broadcast of the second beacon signal.

9. The system of claim 1 wherein the state of each of the first plurality of partitions includes one of armed or disarmed.

10. The system of claim 1 wherein the first plurality of sensors or devices include at least one of output sirens, fire alarms, motion sensors, smoke alarms, and proximity sensors.

11. A method comprising:
a control panel maintaining a record associating a respective one of a first plurality of partitions with each of a first plurality of sensors or devices, the first plurality of sensors or devices assigned to a first access point coupled to the control panel;
a first access point periodically broadcasting a first beacon signal to the first plurality of sensors or devices, the first beacon signal including a first partition state change indicator portion and a first partition state update portion, the first partition state change indicator portion including first respective indicators, each of which corresponds to a respective one of the first plurality of sensors or devices, and the first partition state update portion including first respective update values, each of which corresponds to the respective one of the first plurality of sensors or devices; and
the first plurality of sensors or devices periodically waking up and receiving the first partition state change indicator portion of the first beacon signal from the first access point and remaining awake and receiving the first partition state update portion when one of the first respective indicators corresponding to the respective one of the first plurality of sensors or devices indicates a change in a state of the respective one of the plurality of partitions associated with the respective one of the first plurality of sensors or devices.

12. The method of claim 11 wherein each of the first respective indicators includes a single binary bit value.

13. The method of claim 11 further comprising each of the first plurality of sensors or devices waking up and receiving the first partition state change indicator portion of the first beacon signal from the first access point and returning to a low power sleep state when the one of the first respective indicators corresponding to the respective one of the first plurality of sensors or devices indicates no change in the state of the respective one of the plurality of partitions associated with the respective one of the first plurality of sensors or devices.

14. The method of claim 11 further comprising each of the first plurality of sensors or devices periodically waking up based on a respective wakeup cycle, and wherein each of the first plurality of sensors or devices wakes up, responsive to receiving a respective wake up trigger, to receive a next available broadcast of the first beacon signal that the first access point transmits thereafter, regardless of the respective wakeup cycle.

15. The method of claim 11 further comprising:
the control panel receiving a partition state update signal indicating a change in the state for a first of the plurality of partitions;
the control panel identifying, from the record, a first set of the first plurality of sensors or devices assigned to the first of the plurality of partitions; and
the control panel directing the first access point to toggle the first respective indicators corresponding to each of the first set of the first plurality of sensors or devices in a next broadcast of the first beacon signal.

16. The method of claim 11 wherein a default value of each of the first respective indicators indicates no change in the state of the respective one of the first plurality of partitions.

17. The method of claim 11 further comprising the access point broadcasting the first beacon signal in a designated time slot and each of the first plurality of sensors or devices periodically waking up at a beginning of the designated time slot.

18. The method of claim 11 further comprising:
the control panel including data in the record associating each of a second plurality of sensors or devices with the respective one of the plurality of partitions, the second plurality of sensors or devices assigned to a second access point coupled to the control panel;
a second access point periodically broadcasting a second beacon signal to the second plurality of sensors or devices, the second beacon signal including a second partition state change indicator portion and a second partition state update portion, the second partition state change indicator portion including second respective indicators, each of which corresponds to a respective one of the second plurality of sensors or devices, and the second partition state update portion including second respective update values, each of which corresponds to the respective one of the second plurality of sensors or devices;
the second plurality of sensors or devices periodically waking up and receiving the second partition state change indicator portion of the second beacon signal from the second access point and remaining awake and receiving the second partition state update portion when one of the second respective indicators corresponding to the respective one of the second plurality of sensors or devices indicates a change in the state of the respective one of the plurality of partitions associated with the respective one of the second plurality of sensors or devices;

the control panel receiving a partition state update signal indicating a change in the state for a first of the plurality of partitions;

the control panel identifying, from the record, a first set of the first plurality of sensors or devices and the second plurality of sensors or devices assigned to the first of the plurality of partitions;

the control panel directing the first access point to toggle the first respective indicators corresponding to each of the first plurality of sensors or devices included in the first set of the first plurality of sensors or devices and the second plurality of sensors or devices in a next broadcast of the first beacon signal; and the control panel directing the second access point to toggle the second respective indicators corresponding to each of the second plurality of sensors or devices included in the first set of the first plurality of sensors or devices and the second plurality of sensors or devices in a next broadcast of the second beacon signal.

19. The method of claim 11 wherein the state of each of the plurality of partitions includes one of armed or disarmed.

20. The method of claim 11 wherein the plurality of sensors or devices include at least one of output sirens, fire alarms, motion sensors, smoke alarms, and proximity sensors.

\* \* \* \* \*